United States Patent [19]

Glass et al.

[11] Patent Number: 4,604,288

[45] Date of Patent: Aug. 5, 1986

[54] PROCESS FOR PREPARING A CHEWING GUM COMPOSITION WITH IMPROVED FLAVOR PERCEPTION

[75] Inventors: Michael Glass, Fairlawn; Vincent Corsello, Cedar Knolls, both of N.J.; Daniel A. Orlandi, Flushing; Anthony Guzowski, Maspeth Queens, both of N.Y.

[73] Assignee: Warner-Lambert Company, Morris Plains, N.J.

[21] Appl. No.: 737,299

[22] Filed: May 23, 1985

[51] Int. Cl.⁴ .............................................. A23G 3/30
[52] U.S. Cl. ........................................ 426/5; 426/662
[58] Field of Search ..................................... 426/3–6, 426/662

[56] References Cited

U.S. PATENT DOCUMENTS

| | | | |
|---|---|---|---|
| 2,929,723 | 3/1960 | Schultz et al. | 426/662 |
| 3,995,064 | 11/1976 | Ehrgott | 426/3 |
| 4,157,401 | 6/1979 | Stroz | 426/3 |
| 4,164,594 | 8/1979 | Jackson et al. | 426/662 |
| 4,226,890 | 10/1980 | Howard | 426/662 |
| 4,357,354 | 11/1982 | Kehoe et al. | 426/3 |
| 4,493,849 | 1/1985 | Carroll | 426/662 |

*Primary Examiner*—Jeanette Hunter
*Attorney, Agent, or Firm*—Daniel A. Scola, Jr.; Gary M. Nath

[57] ABSTRACT

The method of preparing a chewing gum comprising the steps of: (a) forming a premixture of lecithin and a liquid flavor; (b) adding the premixture of (a) to chewing gum composition; and (c) forming a chewing gum piece therefrom. The addition of a liquid flavor/lecithin premix mitigates and substantially reduces bitterness or harsh off-notes common with certain flavors.

11 Claims, No Drawings

PROCESS FOR PREPARING A CHEWING GUM COMPOSITION WITH IMPROVED FLAVOR PERCEPTION

The present invention relates to a method for preparing an organoleptically enhanced chewing gum composition and product produced therefrom.

One of the problems associated with the addition of flavor to chewing gum composition is that certain flavors, particularly mint flavors, menthol and the like, exhibit harsh bitter notes at certain levels of addition. These bitter notes create an unpleasant taste and unacceptable organoleptic properties in the chewing gum.

The instant invention is directed toward a unique process of solving the harsh, bitter notes of flavors whereby a premixed quantity of particulate lecithin in combination with a liquid flavor is incorporated into the gum portion of the chewing gum composition.

Lecithin has been used in the prior art as a softener for gum base and as an emulsifier or dispersing agent for flavor. Traditionally, lecithin has been added to the gum base during production and not to the chewing gum portion. See, for example, U.S. Pat. Nos. 4,490,395, 4,466,983 and 4,448,789 which discuss the use of lecithin as an emulsifier.

It has been discovered that when lecithin is premixed with flavor and added to the gum portion of the chewing gum composition, off-notes and harsh bitter tones are significantly moderated to a level not perceptable to the chewer. It is well known that up to about 90% of the flavor in chewing gum gets trapped in the bolus of the chewing gum and therefore, to achieve the flavor perception desired, higher amounts of flavor are added to offset this problem. In doing so, however, certain flavors such as menthol, peppermint oil, spearmint oil, oil of wintergreen (methylsalicylate), cinnamon oil, among others, produce harsh, bitter tones which make the gum unacceptable to the consumer. It is also known that portion of the flavor which is released during chew is typically physically associated with the sweetener, such that their simultaneous release synergistically enhances the overall effect of both sweetness and flavor. The instant invention seeks to use lecithin in a unique way whereby the flavor particles and the lecithin particles are premixed and added to the sweetener. The premix/sweetener mixture is then added to the chewing gum portion of the chewing gum composition, as distinct from the gum base portion.

More particularly, in one embodiment, the instant process comprises the steps of:
(a) preparing a gum base comprising elastomers, softeners and optionally corn syrup;
(b) forming a premix comprising particulate lecithin in the amount of about 8% to about 25% and liquid flavor in the amount of about 92% to about 75%, all amounts based on the percent of the premix;
(c) adding the premix of (b) to a sweetener to form a mixture of sweetener and the premix;
(d) adding the resultant mixture of (c) to the gum base of (a);
(e) adding additional conventional ingredients selected from the group consisting of flavorings, softeners, emulsifiers, coloring, plasticizers and mixtures thereof and mixing to obtain a homogeneous mass;
(f) forming chewing gum pieces therefrom.

The present invention allows for higher levels of flavor to be added without the disadvantages associated with the harsh, bitter off-notes common to flavors at certain levels. High levels of flavor can thus be added without concern and this in turn allows for increased breath freshening as well as enhanced flavor perception.

It is critical that the flavor be a liquid or semi-liquid rather than a solid. Otherwise, the pronounced organoleptic improvements are not present. Solid flavors may be optionally included, however, in addition to the liquid flavor. The mixing of the ingredients is carried out using conventional processing equipment.

The relative amounts of lecithin and flavor are also critical to the instant invention. The instant process is designed to specifically allow and facilitate simultaneous release of the premixture of lecithin and the liquid flavor upon mastication as a means of mitigating or preventing the harsh bitter off-notes of the flavor. It was discovered that the simple addition of the individual components of lecithin and flavor into the chewing gum portion of the chewing gum formulation would not yield simultaneous release of these components for the simple reason that they would not by physically bound together and would therefore, release at different rates.

The instant invention also provides for the manufacture of a chewing gum product by the steps comprising
(a) forming a mixture of lecithin and a liquid or semi-liquid flavor such that the lecithin adheres to uniformly mix with the flavor;
(b) adding the premixture of (a) to a chewing gum composition; and
(c) shaping the resultant mixture into a chewing gum piece.

The lecithin used in the instant process should be of a high quality and purity, being substantially free from flavor off-notes or negative residual flavor. Ordinarily, particulate lecithin is available with a purity of 95% acetone insolubles which is suitable for the instant process. In particular, the brand "YELKIN T" is most effective in the process described herein (YELKIN T is a trademark of Ross & Rowe (ADM Foods). The instant process requires the lecithin to have a minimum purity of about 65% acetone insolubles and preferably about 72% acetone insolubles. The *Condensed Chemical Dictionary,* 9th edition, Van Nostrand Reinhold, 1977, defines lecithin as mixtures of digylcerides of fatty acids linked to the choline ester of phosphoric acid. Lecithins are classed as phosphoglycerides or phosphatides. In the instant invention, the lecithin must have a minimum of about 65% by weight of phosphatide present. This purity level is generally designated in commercially available lecithins as "65% acetone insolubles." The phrase "95% acetone insolubles" is intended to mean that upon dissolution of the lecithin in acetone, 65% of the lecithin (the phosphatide portion) remains insoluble. Residual impurities such as oil, moisture and soluble non-phosphatides account for the 35% of the materials dissolved and extracted by the acetone.

The instant invention requires lecithin to have a purity level of about 65% acetone insolubles and preferably about 72% acetone insolubles. In the most preferred embodiment, the purity level is 68% acetone insolubles.

In preparing the formulation for use in the instant process, a portion of or all of the sweeteners and bulking agents traditionally added to the gum portion of the chewing gum composition may be mixed with the gum base prior to the addition of the premix. The gum base thus becomes saturated and bound by the sweeteners and building agents and will be unlikely to absorb the premix. In this manner, migration of the premix into the gum base will be precluded, thereby preventing the premix components from becoming locked into the gum base.

The premix, as mentioned above, comprises lecithin and a liquid or semi-liquid flavor component. By the term "liquid" and "semi-liquid" flavor is meant any wet, flowable flavor mixture. The particulate lecithin is present preferably in the amount of about 5 to about 20% by weight of the premix and most preferably in the amount of about 12 to about 14%. Flavor is present in amounts of about 80 to about 95% by weight of the premix and preferably about 85 to about 90%.

Flavoring agents well known to the chewing gum art may be used in the premix of the instant invention. These flavoring agents may be chosen from synthetic flavor oils, flavorings and/or oils derived from plants, leaves, flowers, fruits and so forth, and combinations thereof. Representative flavor oils include: spearmint oil, cinnamon oil, oil of wintergreen (methylsalicylate) and peppermint oils as well as their flavoring replacements. Also useful are artifical, natural or synthetic fruit flavors such as citrus oil including lemon, orange, grape, lime and grapefruit and fruit essences including apple, strawberry, cherry, pineapple and so forth. Other fruit flavors well known to the art are also employable.

Additional flavoring agents may be employed separately and in addition to the flavoring in the premix. These additional flavors may be used in various amounts subject to such factors as flavor type, base type and strength desired. In general, amounts of about 0.05% to about 3.0% by weight of the final chewing gum composition are useable with amounts of about 0.3% to about 1.5% being preferred and about 0.7% to about 1.2% being most preferred. As stated previously, however, the relative amounts of lecithin and flavor in the premix itself are important to obtaining the advantages of the instant invention. The ratio of lecithin to flavor in the premix is about 1:4 to about 1:19.

A sweetener may be added to the premix or separately in the gum formulation. Advantages in adding it in the premix include a simultaneous release of flavor and sweetener whereby synergistic perceptions of both flavor and sweeteners is experienced.

The sweetener is preferably sugar, but may also be selected from a wide range of materials including water-suluble agents, water-soluble artificial sweeteners, polyols and dipeptide based sweeteners or combinations thereof. Whichever sweetener or mixture of sweeteners are chosen, they should provide adequate bulk to allow for proper processing when combined with the other chewing gum ingredients and should provide adequate means of transporting the lecithin and flavor into the saliva upon mastication.

Particular representative sweeteners in addition to sugar are illustrated below but are not intended to be a limitation on the scope of the useful sweetener that can be employed.

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch or corn syrup solids and sugar alchols such as sorbitol, xylitol, mannitol; talin, dihydrochalcone; glycyrrhizin; *stevia rebaudiana* (stevioside); and mixtures thereof.

B. Water-soluble artificial sweeteners such as the soluble saccharine salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and material described in U.S. Pat. No. 3,492,131 and the like.

The water-soluble sweeteners described in category A. above, are preferably used in amounts of about 25% to about 75% by weight and most preferably from about 50% to about 65% by weight of the final chewing gum composition. In contrast, the artificial sweeteners described in categories B. and C. are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils. Mixtures of the various sweeteners are also contemplated.

The gum base used in this invention may be any water-insoluble gum base well known in the art. Illustrative examples of suitable polymers in gum bases include both natural and synthetic elastomers and rubbers. For example, those polymers which are suitable in gum bases, include, without limitation, substances or vegetable origin such as chicle, jelutong, balata, gutta percha, lechi caspi, sorva, guayale rubber, crown gum and mixtures thereof. Synthetic elastomers such as butadiene-styrene copolymers, isobutylene-isoprene copolymers, polyethylene, polyisobutylene, polyvinylacetate and mixtures thereof, are particularly useful.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester or partially hydrogenated wood rosin or gum, pentaerythritol ester of wood rosin or gum, glycerol ester of polymerized rosin, glycerol ester of tall oil rosin, glycerol ester of wood rosin or gum and partially hydrogenatd wood rosin or gum, and partially hydrogenated methyl ester or rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine and the like, may also be incorporated into the gum base to obtain a variety of desirable textures and consistency properties. These additional materials are generally employed in the amounts of up to about 30% by weight and preferably in amounts of from about 3% to about 7% by weight of the final gum base composition.

The chewing gum composition of this invention may additionally include the conventional additives of coloring agents such as titanium dioxide; additional fillers such as aluminum hydroxide, alumina, aluminum silicates; gum base fillers such as talc and calcium carbonate dibasic calcium phosphate and combinations thereof; and additional emulsifiers such as glycerol monostearate. The amount of filler in the gum base should remain within the range of about 10 to 25% by weight of the gum base. By varying the type and amount of fillers, the chew characteristics and texture can be varied as desired.

The chewing gum compositions made from the instant process may be of the sugar or sugarless variety and may be formulated into regular or non-adhering chewing gum pieces. Bubble gum, stick gum, pillow shaped, chunk, coated, and other gum piece forms well known to the art are contemplated.

In the prior art, the process of preparing chewing gum compositions comprises adding to a suitable gum kettle a melted blend of gum base and corn syrup and lecithin and mixing until homogenous. Usually a homogeneous mass is obtained in about six (6) minutes at a temperature of about 55° to about 65° C. Sugar, dextrose, malto dextrin and color are then blended into the homogeneous mass for approximately two (2) minutes. Flavor is added next and mixed until sufficiently homogeneous.

In the instant process, the addition of the premix containing the lecithin and flavor is preferably carried out along with the addition of sweeteners, rather than having the lecithin added separately as an emulsifier to the gum base. As a last step, glycerin and other conventional additives may be added.

The following examples serve to provide further appreciation of the invention but are not meant in any way to restrict the effective scope of the invention. All percentages throughout the specification are by weight % of the final composition unless otherwise indicated.

EXAMPLE 1

This example demonstrates the difference between the instant process and the conventional prior art process. The formulation of the chewing gum compositions are recited in Table I.

The Prior Art Process

The prior art chewing gum compositions A and B were made using the conventional prior art process of making chewing gum compositions comprising the following steps:
(1) Mixing gum base, corn syrup and lecithin in a mixing kettle until a homogeneous mixture is obtained;
(2) Mixing in part of the total sweetener and part of the flavor;
(3) Adding the remainder of the sweetener and flavor and mixing until homogeneous; mixing in the remainder of other conventional ingredients such as additional emulsifiers, colorings, fillers, etc.

The Inventive Process

In contrast to the above prior art process, chewing gum containing the inventive premix (compositions I and II) were made using the following process:
(a) preparing a conventional gum base (176 kilos) comprising elastomers, softeners and corn syrup;
(b) preparing a premix by mixing about 900 grams of lecithin with about 5,000 milliliters of peppermint oil; the lecithin is preferably heated to reduce its viscosity prior to mixing with the flavor and the final temperature of the premix is about 37°–41° C.;
(c) adding about 271 kilos of sugar to the premix of (b) as a sweetener;
(d) blending the resultant mixture of (c) with the gum base of (a), after which other conventional ingredients are added.

Chewing gum pieces made from the prior art and inventive processes were given to an expert panel for evaluation of the various sensory attributes of the gum. Most notably, the panelists focused on the flavor perception and enhancement of breath freshening.

Particular attention was paid to any harshness, bitterness or off-note quality of the flavor.

The prior art chewing gums (A and B) served as controls since they were made without using the inventive premix. As described above, the prior art compositions were made by adding the lecithin in the initial mixing step into the gum base and adding the flavors separately toward the end of the process.

The panelists were trained experts in the evaluation of chewing gum compositions and each rated nine (9) specimens of gum formed by the instant process and nine (9) from the prior art process. The sensory attributes were rated after 0, 5 and 10 chews and at 2, 5, 7 and 10 minutes of chewing.

The panelists rated the chewing gum formed from the instant process significantly higher in intensity of flavor, sweetness, and breath freshening than the prior art process. No off-notes or harsh, bitter tones were perceived. The control chewing gum process, however, resulted in gum which exhibited noticeable harshness and bitterness due to the flavor.

This example clearly demonstrates that to overcome the unpleasant harshness and bitterness of flavor oils of the prior art chewing gums, it is necessary that the applicant's process of forming the premix be performed. It is apparent from the above panel results that merely adding lecithin and flavor independently to a chewing gum composition as in the prior art did not effectively mask or mediate the unpleasant perception caused by the bitter flavor notes.

TABLE I

| | (% by weight) Chewing Gum Compositions | | | |
| --- | --- | --- | --- | --- |
| | Prior Art | | Inventive | |
| Ingredients | A | B | I | II |
| Gum Base | 21 | 21 | 21 | 21 |
| Corn Syrup | 17 | 17 | 17 | 17 |
| Sugar | 59.69 | 59.69 | 59.69 | 59.69 |
| Glycerin | 0.65 | 0.65 | 0.65 | 0.65 |
| Cinnamon Flavor | 1.110 | 0.94 | — | — |
| Menthol | 0.35 | 0.25 | — | — |
| Lecithin | 0.200 | 0.200 | — | — |
| Premix | — | — | (a)1.660 | (b)1.390 |
| (a)Premix comprises: | | 1.110% | cinnamon flavor | |
| | | 0.350% | menthol flavor | |
| | | 0.200% | lecithin | |
| | | 1.660% | | |
| (b)Premix comprises: | | 0.94% | cinnamon flavor | |
| | | 0.25% | menthol flavor | |
| | | 0.20% | lecithin | |
| | | 1.39% | | |

EXAMPLE II

The inventive process of Example I was followed in making a peppermint and spearmint flavored chewing using formulations I and II. The cinnamon flavor in formulations I and II were replaced by an equal amount of peppermint and spearmint flavor respectively.

The expert panel evaluated the resultant chewing gum pieces in the manner described in Example I. The conclusion of the panel was that the gum exhibited superior attributes over the gum made via the prior art process and exhibited no bitter or harsh tone in spite of the relatively high amounts of menthol and mint flavor, which are known to cause bitterness.

The invention being thus described, it will be obvious that the same may be varied in many ways. Such variations are not to be regarded as a departure from the spirit and scope of the invention and all such modifications are intended to be included within the scope of the claims.

We claim:

1. The process of making an organoleptically pleasant chewing gum composition free of harsh or bitter flavor notes comprising:
    (a) forming a premix comprising particulate lecithin present in the amount of about 8 to about 25%, a liquid or semi-liquid flavor present in amounts of about 75 to about 92%, all percents being based on the total weight of the premix;
    (b) mixing the premix of (a) with an effective amount of sweetener;
    (c) further mixing the resultant mixture of (b) with a gum base comprising elastomers and softeners to obtain a homogeneous mass.

2. The process of claim 1 wherein the sweetener is sugar.

3. The process of claim 2 wherein the particulate lecithin is of a high purity being substantially free from perceptible off-flavor notes and having at least 65% acetone insolubles.

4. The process of claim 2 wherein the particulate lecithin is present in the amount of about 0.2 to about 0.3% by weight of the final chewing gum composition.

5. The process of claim 2 wherein the gum base comprises a natural or synthetic rubber.

6. The process of claim 5 wherein the natural or synthetic rubber is selected from the group consisting of chicle, jelutong, balata, gutta-percha, lechi caspi, sorva, guayule rubber, and mixtures thereof.

7. The process of claim 5 wherein the synthetic rubber is selected from the group consisting of butadiene-styrene copolymers, polyisobutylene, isobutylene-isoprene copolymers and mixtures thereof.

8. The process of claim 3 wherein the sweetening agent is selected from the group consisting of water-soluble sweetening agents, water-soluble artificial sweeteners, dipeptide based sweeteners and mixtures thereof.

9. The process of claim 3 wherein there is present a material selected from the group consisting of plasticizers, flavoring agents, additional fillers and emulsifiers and mixtures thereof.

10. The process of claim 9 wherein the flavoring agent is selected from the group consisting of spearmint oil, peppermint oil, cinnamon oil, oil of wintergreen (methylsalicylate), lemon oil, orange oil, grape flavor, lime oil, grapefruit oil, apple essence, strawberry essence, cherry essence, pineapple essence and a citrus combination.

11. A method of preparing a chewing gum which comprises:
    (a) forming a premixture of lecithin and a liquid flavor such that the flavor and lecithin are uniformly mixed;
    (b) adding the premixture of (a) to a chewing gum composition; and
    (c) forming a chewing gum piece therefrom.

* * * * *